United States Patent Office 2,946,974
Patented July 26, 1960

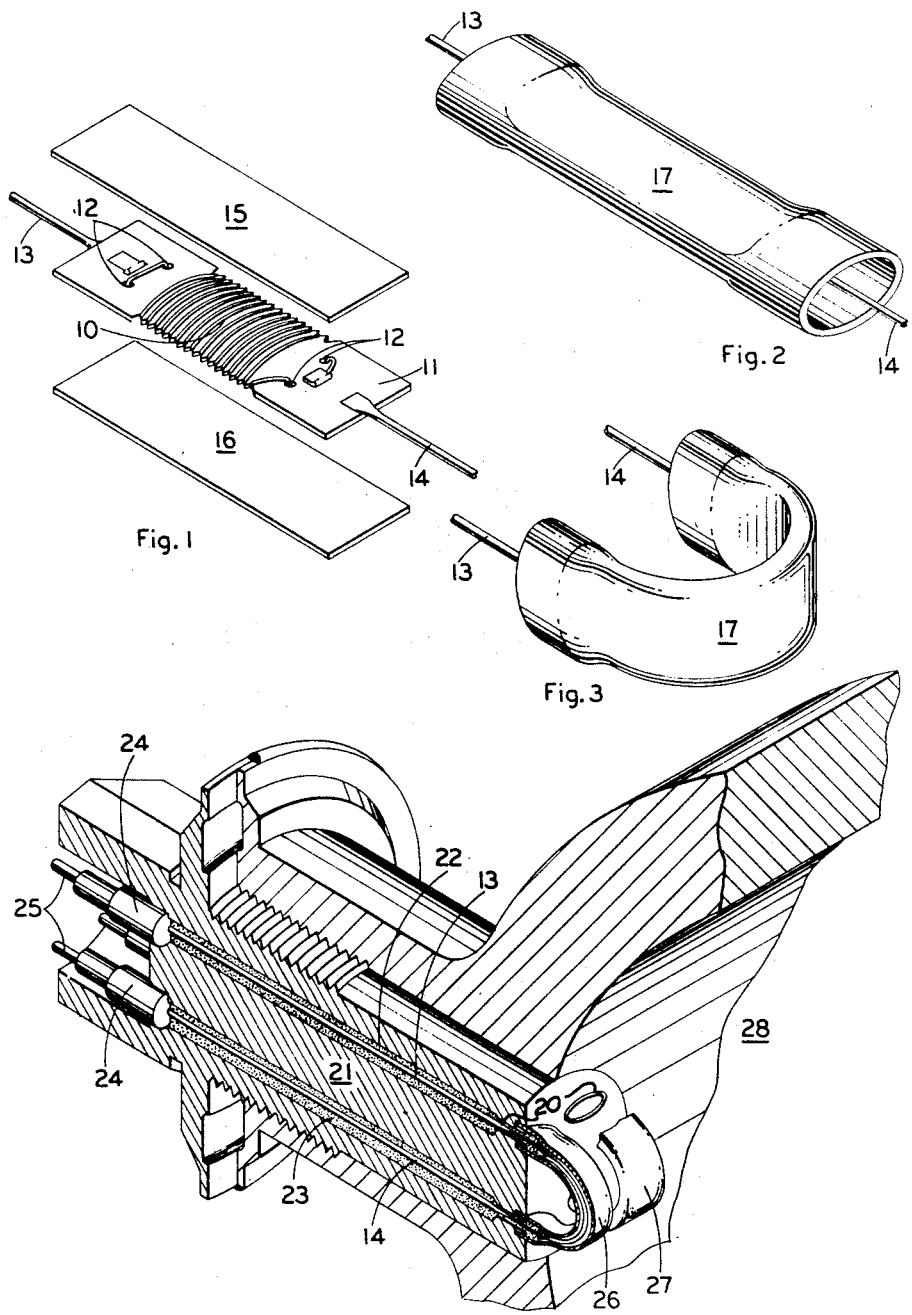

2,946,974
RESISTANCE TEMPERATURE DETECTOR

Frederick R. Sias, Lynchburg, Va., assignor to General Electric Company, a corporation of New York Filed Mar. 5, 1958, Ser. No. 719,350

10 Claims. (Cl. 338—28)

This invention relates to temperature detectors and more particularly to so-called resistance temperature detectors whose electrical resistance varies as a function of temperature. Such resistance temperature detectors are commonly connected in bridge circuits which may, in one type of system, be energized by a constant current source to produce a voltage at the output terminals of the bridge which is proportional to the temperature under measurement.

There are conflicting requirements for an effective resistance temperature detector sensing element. One requirement is that the detector must have a rapid response time; to provide the rapidity of response the detector should, in general, be small in order to have a low thermal capacity. On the other hand, since a resistance temperature detector by its very nature must draw some current in order to operate, the internal heat developed in the detector should be easily dissipated; but rapid heat dissipation necessitates that the unit should have a large surface area. Ruggedness is an essential characteristic of many resistance temperature detectors, especially when they are employed in the measurements of temperatures of fluids subject either to high pressures, to high rates of flow or to both. However, increasing the mass of a resistance temperature detector in order to give it strength adversely affects the speed of response.

It is an object of this invention to provide a resistance temperature detector which is fast in response and yet possesses a high degree of strength and a large enough surface area to dissipate effectively the internal heat developed within the detector.

It is a further object of this invention to provide a new method of construction of resistance temperature detectors which method results in considerably improving the response time of the detectors.

By way of a brief summary of one aspect of the present invention, I provide a resistance element formed of tungsten wire wound in a flattened spiral on a notched mica card with Nichrome leads attached to the ends. Additional mica strips are placed on either side of the winding to form an insulated sandwich which is then inserted within a partially flattened metallic tube. The basic assembly is then bent in a die into a permanent U shape. This operation, by stretching the outside wall of the U beyond its elastic limit, leaves both of the flattened arcuate walls of the tube pressing on the mica sandwich with considerable pressure, thus establishing a very good thermal contact. In the bending operation the ends of the tube are not compressed but are permitted to retain an oval bell shape. These ends are then inserted into a machined groove in a mounting block and brazed in place, the remaining space in the sensing element around the lead being filled with alumina powder packed as tightly as possible.

While the scope of this invention is not to be limited except by a fair interpretation of the appended claims, further details of these teachings as well as additional objects and advantages of the structure disclosed will be better understood in connection with the accompanying drawings, wherein:

Figure 1 is a disassembled view of the basic resistance element and its associated insulators;

Figure 2 is a view of the resistance element after its insertion in a flattened metal tube;

Figure 3 shows the assembly of Figure 2 after it has been bent into a U shape; and Figure 4 is an isometric view partially cut away showing the final resistance temperature detector installed in a high pressure mounting.

As shown in Figure 1 the resistance element 10, preferably formed of tungsten wire for reasons to be explained later, is wound on a flexible notched mica strip 11 preferably made up of several thin laminations. The ends of the resistance element are passed through apertures 12 and spot welded to a pair of Nichrome connecting leads 13 and 14. In order to reduce the possibility of strain on the tungsten wire at the points where it bends over the edges of the mica strip, the turns are wound in a loose oval as shown, thereby increasing the radius of curvature of the wire as it passes through the notches. In the next assembly operation the resistance winding and notched mica strip are sandwiched between additional flexible mica strips 15 on the one side and 16 on the other side, each of which strips is also formed preferably of several thinner laminations for flexibility. These strips are placed on in such a manner as to lay the oval turns over to one side, instead of merely flattening the turns, to keep the bend radius as large as possible. In this way undue strains or distortions which might change the resistance characteristics of the resistance wire are avoided.

Next, the laminar structure is inserted within the stainless steel tube 17 shown in Figure 2. This tube is nearly flattened along most of its length except for the end portions which have the shape of bell-like ovals. As an important feature of these teachings, the basic assembly is then bent or pressed into a U shape as shown in Figure 3 around a circular anvil, this being an operation which stretches the outer part of the U beyond its elastic limit. Thus tightened onto the resistance element, the flattened arcuate walls of the protective tube 17 are forced into very intimate thermal contact with the resistance element through the mica insulation both on the inside and outside of the U-shaped bend. In the bending operation the oval end pieces of the protective tube are not flattened but are maintained in substantially the same shape.

As best shown in Figure 4, the oval end pieces of the protective tube are inserted into machined grooves 20 in a supporting base constituted, in this embodiment, by a threaded pressure block 21 of stainless steel with the connecting leads 13 and 14 running through passages 22 and 23 in the pressure block. This method of mounting leaves the protective tube supported both on its inside and on its outside. After the protective tube is brazed in place, the remaining space around the leads in the pressure block and in the oval end sections of the protective tube is filled with an insulant, preferably a ceramic powder, such as alumina, packed as tightly as possible.

Tungsten as well as most other resistance element materials should be protected by an inert atmosphere in order to prevent reaction with air or other surrounding media. For this purpose helium is then added to the passages within the pressure block and protective tube at a pressure slightly higher than atmospheric pressure, after which high temperature hermetic seals 24, preferably of ceramic, are brazed or welded in place around terminals 25.

The resulting construction of the resistance temperature detector assembly is one which is extremely rugged, making the resistance temperature detector especially suitable for the measurement of temperatures in fluids subjected both to high pressures and to very rapid rates-of-flow. High external pressures cannot distort the protecting tube; instead they tend only to increase the pressure on the sensing element and to improve its response characteristics. The direction of flow of the fluid medium whose temperature is under measurement should, as might be expected, be such as to direct it along the axis of the flattened U shape of the protective tube, thus bringing the fluid into immediate contact with both inner and outer surfaces of the arcuate protective tube. When installed in this manner, the resistance temperature detector possesses a very rapid response time and presents its most rigid dimensions to the force of rapid fluid flow.

I have preferred to construct the resistance winding itself of tungsten because of the pressures to which the resistance winding is subjected not only during the bending operation, but also while measuring temperatures of high pressure fluids. If the sensing winding were made of platinum or other soft metal, the pressure on it could seriously strain and distort the wire thus changing its resistance characteristics. When tungsten is used, its high strength allows little change in resistance during the forming process. Tests made on the completed temperature resistance detector show that the temporary change in resistance of the tungsten element due to external pressure during measurement is negligible. I have preferred to employ about 30 inches of tungsten wire having a 3 mil diameter, the length being adjusted to give a resistance of about 10 ohms at 0 degree centigrade. With these parameters the high purity tungsten wire employed yields a change in resistance of about 4 ohms per change of 100 degrees centigrade in temperature.

Naturally the speed of response of a resistance temperature detector requires some definition. When it is defined in terms of how much time is required for the resistance element to respond by 90 percent to a sudden temperature change when the fluid under test is water flowing at a speed greater than 5 feet per second, the speed of response of the resistance temperature detector described above is less than 1½ seconds. This rapidity of response is achieved with a construction capable of withstanding pressures well in excess of 5,500 pounds per square inch. The ability of the assembly to withstand such pressures is due partly to its compact flattened nature and partly to the oval shape of the end portions of the protective tube. The oval bell-shaped ends stiffen the protective tube where it attaches to the pressure block while at the same time offering little resistance to the fluid flow through and about the U-shaped element. Simultaneously with the achievement of a rapid response time, the above-described construction results in rapid dissipation of the heat developed within the resistance temperature detector by the electrical currents flowing therein. This is due partly to the fact that the surface exposed to the fluid under measurement is comparatively large and partly to the intimate thermal contact between the resistance winding and the outer protective tube.

I have shown the resistance temperature detector of Figure 4 equipped with two separate sensing elements 26 and 27. This construction makes possible two separate temperature measurements with a single penetration of the chamber 28 containing the fluid whose temperature is under measurement. The two sensing elements make for a very versatile assembly, for the second element may serve as a spare in case of failure of one element or, in combination with a similar element placed elsewhere in the chamber 28, it can be used for another type of measurement such as the average or difference between two temperatures in the fluid under measurement.

While I have described but one principal embodiment of a resistance temperature detector, it is intended that this example should be illustrative and not necessarily limiting of the principles contained in these teachings. To those skilled in the art to which this disclosure pertains, there will undoubtedly occur certain variations within the scope of this invention in its broader aspects.

What I claim as new and desire to secure by Letters Patent of the United States is:

1. The method of manufacturing a resistance temperature detector assembly comprising: winding a flattened spiral of temperature sensitive resistance wire onto a flat flexible insulating support; applying electrical insulation to said resistance wire; inserting said wire and support into a hollow metallic protective tube; bending said tube and contents into a flattened arcuate shape to compress the contents of said tube between the flattened sides thereof, said bending being sufficient to exceed the elastic limit of a portion of the tube to retain the bent shape thereof but not exceeding the breaking stress of said tube; and sealing the ends of said tube to a suitable base with electrical connections from said resistance wire passing through said base.

2. A resistance temperature detector assembly comprising: a flexible substantially flat temperature responsive resistance element; a flattened protective tube enclosing said resistance element, said tube having been bent into a flattened arcuate shape after insertion of said resistance element, whereby the flattened sides of said tube are forced into intimate thermal contact with said element and a portion of the tube is bent beyond the elastic limit thereof to retain said shape.

3. A resistance temperature detector assembly comprising: a flexible substantially flat temperature responsive resistance element; a flattened protective tube enclosing said resistance element, said tube having been bent into a flattened arcuate shape after insertion of its contents whereby the flattened sides of said tube are forced into intimate thermal contact with said contents, the ends of said tube being flared out into a substantially oval cross-section; a mounting base; and means fastening the oval ends of said protective tube to said base; and connecting leads passing through said base for making electrical contact with said resistance element.

4. A resistance temperature detector assembly comprising: a temperature responsive element sandwiched between layers of a flexible electrical insulating material; and a flattened metallic tube enclosing said element and said layers of insulating material, said tube having been bent into an arcuate shape after the insertion of said element and said layers, whereby the flattened sides of said tube are forced into intimate thermal contact with the contents of said tube and a portion of the tube is bent beyond the elastic limit thereof to retain said shape.

5. A resistance temperature detector assembly comprising: a flexible flat strip of electrical insulating material; a tungsten resistance wire wound in a flat spiral on said strip; a flattened protective tube enclosing said wire and strip, said tube having been bent into a flattened arcuate shape after insertion of its contents whereby the flattened sides of said tube are forced into intimate thermal contact with said contents, the ends of said tube being flared out into a substantially oval cross section; a supporting base; means fastening the oval ends of said tube to said supporting base; and connecting leads connected to said resistance wire and passing through said supporting base for making electrical contact with said resistance wire.

6. A resistance temperature detector assembly comprising: an insulated tungsten resistance element; a flattened metallic tube enclosing said element, said tube having been bent into an arcuate shape, whereby the flattened sides of said tube are forced into intimate thermal contact with said element, the ends of said tube being flared out into a substantially oval cross section; a metallic supporting base; means fastening the oval ends of said tube to said supporting base; and insulated connecting leads connected to said resistance element and passing through said supporting base at the oval ends of said tube.

7. A resistance temperature detector assembly comprising: a temperature responsive element, a flattened metallic tube surrounding said element, insulating material interposed between said element and said tube, said tube having been bent into an arcuate shape after the insertion of said element and said insulating material with sufficient pressure to force the sides of the tube into intimate thermal contact with the contents thereof and bend the tube beyond its elastic limit to retain the shape thereof.

8. A resistance temperature detector assembly comprising: a temperature responsive element, a flattened metallic tube surrounding said element, insulating material interposed between said element and said tube, said tube having been bent into a U shape after the insertion of said element and said insulating material with sufficient pressure to force the sides of the tube into intimate thermal contact with the contents thereof and bend the tube beyond its elastic limit to retain the flattened shape thereof.

9. A resistance temperature detector assembly comprising: a temperature responsive element, a flattened metallic tube surrounding said element, insulating material interposed between said element and said tube, said tube having been bent into a U shape after the insertion of said element and said insulating material with sufficient pressure to force the sides of the tube into intimate thermal contact with the contents thereof and bend the tube beyond its elastic limit to retain the shape thereof, means to hermetically seal the tube at the ends thereof, and connecting leads passing through said sealing means for making electrical contact with said resistance element.

10. The method of manufacturing a resistance temperature detector assembly comprising: inserting a substantially flat electrically insulated temperature responsive resistance element into a hollow protective metallic tube, and bending said tube and contents into a flattened arcuate shape, said bending exceeding the elastic limit of a portion of the tube without exceeding the breaking stress thereof, to retain the shape of the tube without rupture, and to compress the contents of said tube between the flattened sides of said tube in intimate thermal contact therewith.

References Cited in the file of this patent

UNITED STATES PATENTS 2,795,681    Ewald _____ June 11, 1957

FOREIGN PATENTS 981,893    France _____ Mar. 1, 1949